United States Patent [19]

Kulkarni et al.

[11] 4,395,352

[45] Jul. 26, 1983

[54] HIGH EFFICIENCY ANTIFOAM COMPOSITIONS AND PROCESS FOR REDUCING FOAMING

[75] Inventors: Ravindra D. Kulkarni, Pomona; Bernard Kanner, West Nyack, both of N.Y.; Errol D. Goddard, Haworth, N.J.

[73] Assignee: Union Carbide Corporation, Danbury, Conn.

[21] Appl. No.: 112,138

[22] Filed: Jan. 14, 1980

Related U.S. Application Data

[63] Continuation-in-part of Ser. No. 920,459, Jun. 29, 1978, abandoned.

[51] Int. Cl.³ .................. B01D 19/04; C09K 3/00
[52] U.S. Cl. .................. 252/321; 252/174.15; 252/358; 252/DIG. 10; 252/DIG. 14
[58] Field of Search .................. 252/321, 358

[56] References Cited

U.S. PATENT DOCUMENTS

| 3,115,472 | 12/1963 | Currie ............... 252/321 X |
| 3,650,979 | 3/1972 | Steinbach et al. ....... 252/321 X |
| 4,076,648 | 2/1978 | Rosen ................. 252/358 |

Primary Examiner—Richard D. Lovering
Attorney, Agent, or Firm—Paul W. Leuzzi, II

[57] ABSTRACT

Antifoam compositions containing high viscosity polydiorganosiloxane oils, finely divided hydrophobic solids, and siloxanepolyoxyalkylene block copolymer surfactants, which can be used per se or in the form of emulsions.

12 Claims, No Drawings

HIGH EFFICIENCY ANTIFOAM COMPOSITIONS AND PROCESS FOR REDUCING FOAMING

CROSS-REFERENCE TO RELATED APPLICATION

This is a continuation-in-part of U.S. patent application Ser. No. 920,459, which was filed June 29, 1978 (now abandoned).

BACKGROUND OF THE INVENTION

1. Field of the Invention

The present invention relates to polydiorganosiloxane-based antifoam compositions and to their use in the reduction of foaming in aqueous liquids.

2. Description of the Prior Art

U.S. Pat. No. 4,076,648 discloses self-dispersible antifoam compositions. The self-dispersible antifoam compositions of said patent comprise a lipophilic nonionic surface active agent, which may be a siloxane-oxyalkylene block copolymer, homogeneously dispersed in a non-emulsified diorganosiloxane antiform agent, which may consist of a finely divided inorganic filler in a diorganopolysiloxane oil. All of the antifoam compositions specifically disclosed by said patent are based upon a polydiorganosiloxane oil having a 25° C. viscosity of 500 centistokes. Said patent teaches, in its generic descriptions, that polydiorganosiloxane oils having 25° C. viscosities of from 5 to 3000 centistokes are preferred and that such oils having viscosities of up to 100,000 may be utilized. Since apparently only the 500 centistoke oil was actually tested, the implication seems to be that the polydiorganosiloxane oil viscosity is not a significant factor, and that such oils having higher viscosities, e.g. up to 100,000 centistokes, would provide antifoam compositions more or less equivalent in effect to those based on the 500 centistoke oil.

SUMMARY OF THE INVENTION

Applicants have found, quite unexpectedly, that unlike 500 centistoke polydiorganosiloxane oil-based antifoam compositions such as those described in U.S. Pat. No. 4,076,648, antifoam compositions based upon polydiorganosiloxane oils having viscosities in the range of from 5000 to 30,000 centistokes at 25° C. are unexpectedly efficient even in such difficult-to-defoam aqueous systems as those which contain high concentrations of ionic surfactants and those which are very viscous, systems in which the 500 centistoke oil-based antifoam compositions are not particularly efficient.

The high efficiency antifoams of the present invention comprise a polydiorganosiloxane oil having a viscosity of from 5000 to 30,000 centistokes at 25° C., a finely divided hydrophobic solid having a surface area of from 50 to 1000 square meters per gram, and a siloxaneoxyalkylene block copolymer surfactant having a hydrophilic-lipophilic balance (HLB) of from 4 to 14.

DESCRIPTION OF THE PREFERRED EMBODIMENTS

The antifoam compositions of the present invention are especially effective in foaming systems containing high concentrations of ionic surfactants (near, at, or above the critical micelle concentration). Under such conditions, the antifoam compositions of U.S. Pat. No. 4,076,648 are much less effective than are those described and claimed herein.

This new antifoam contains three basic ingredients and can be prepared in the manner shown below:

| | | | |
|---|---|---|---|
| A + B | shear | C | (1) |
| C + D | controlled shear | X | (2) |
| X + F + H$_2$O | emulsification | Y | (3) |

In above Equation (1), A is a silicone oil (i.e. a liquid diorganosiloxane polymer) which can be of any of the well-known types heretofore employed in the preparation of antifoam compositions. The polymers generally have hydrocarbon groups having from 1 to 18 carbon atoms, e.g. alkyl, aryl, alkaryl, aralkyl and the like, bonded to silicon in the ratio of about 1.8 to about 2.2 hydrocarbon groups per silicon atom. Most preferably, the hydrocarbon group is methyl and the basic unit of the polymer is the dimethylsiloxane unit which constitutes at least 65 mol percent and preferably at least 97.0 mol percent or more of the siloxane polymer. Other units can be presented, such as trimethylsiloxane units which can be presented in amounts of less than 1 mole percent of the polymer such that the resulting viscosity will be 5000 to 30,000 centistokes. In addition, the polymer can contain still other units, such as, monomethylsiloxane units and unsubstituted siloxane units, i.e., SiO$_2$, in minimum amounts of less than 10 mol percent and preferably below 0.2 mol percent of the siloxane polymer. Preferred diorganosiloxane polymers are the trimethylsiloxy end-blocked dimethylsiloxane polymers having the formula:

$$Me_3SiO(Me_2SiO)_nSiMe_3 \qquad (I)$$

wherein Me designates the methyl group and n is an integer. The diorganosiloxane polymers according to the present invention have a viscosity in the range of about 5000 to about 30,000 centistokes measured at 25° C. Especially preferred are dimethylsiloxane polymers having a viscosity in the range of about 10,000 to 30,000 centistokes at 25° C. Thus the value of the integer n is such that the siloxane polymer possesses a viscosity within the range indicated. For example, when n is about 750, the viscosity is about 10,000 centistokes at 25° C.

In above Equation (1), B is a hydrophobic finely divided inorganic filler which can be of any type normally employed in making antifoams. Powdered alumina and titania are suitable but the hydrophobic solid is conveniently fumed silica or precipitated silica with an average particle size of about 200 A, resulting in a surface area of 325 square meters per gram. The surface of these inorganic solids can be rendered hydrophobic by treating them with organic or organosilicon compounds having at least one of the functional groups such as —OH, —SH, —NH$_2$, —NHR, —NR$_2$, and —NR$_3$+ which are capable of interacting with the inorganic filler surfaces. Typically one can employ disilazanes or silanes such as hexamethyldisilazane, octadecyl trichlorosilane, allyl trichlorosilane, dialkyl dichlorosilane, alkyl monochlorosilane, alkyl trialkoxysilane, dialkyl dialkoxysilane, trialkyl-monoalkoxysilane, or primary, secondary, tertiary or quaternary alkyl or alkylether amines where the alkyl groups can have 1–18 carbon atoms preferably 1–8 for silicone compounds and 8–14 for organic amine compounds. A typical process for making hydrophobic filler particles consists of tumbling fine silica, which can be either precipitated or fumed or combination of both, with the appropriate hydrophobizing reagent and suitable amounts of alcohol/water mixture. The tumbled product is then heated in an oven at moderate temperatures for two hours. The preparation of suitable hydrophobic solids is found e.g. in U.S. Pat. Nos. 2,802,850, 3,634,288, 3,649,588, and 3,953,487.

In above Equations (1) and (2), Compound C is an intermediate product which is obtained by blending the silicone oil A with the hydrophobic inorganic filler B. The blending is done to obtain a homogeneous mixture of B with A, and can be done at any convenient temperature, e.g. from 20° C. to 150° C., preferably at room temperature. For highly viscous mixes, elevated temperature mixing may be desirable for ease of operation. The relative amounts of B to A can vary from 1 to 20 percent by weight, and is preferably about 3%.

In above Equation (2), the surfactant D should be such that its mixing with C will impart the following properties to the antifoam: (a) improve the spreading power of the droplet over the foam bubble, (b) reduce the ionic foaming surfactant adsorption onto the antifoam drop so as to minimize the repulsive force during its transport to the bubble surface and (c) improve the stability of the antifoam droplet against coalescence. To serve these functions the surfactant should have hydrophobic (or lipophilic) groups, preferably silicone groups such as $(CH_3)_3SiO-$, $-(CH_3)_2SiO-$, or $-CH_3(R-)SiO-$, which will be compatible with the silicone oil phase and hydrophilic nonionic groups such as polyoxyethylene groups which are soluble or compatible with the aqueous foaming solution used. The surfactant D according to this invention is a block copolymer. The term "block copolymer" is used herein to denote a material wherein at least one section ("block") of the molecule is composed of recurring monomeric units of one type and at least one other section ("block") of the molecule composed of recurring monomeric units of a different type. The different sections of blocks in the molecule can be arranged in any configuration (e.g., AB, ABA, branched or cyclic). Thus the term block copolymers as used herein includes graft copolymers. The block copolymers used in this invention can be discrete chemical compounds. Usually, however, the block copolymers are mixtures of various discrete block copolymer species. The block copolymers are usually mixtures due, at least in part, to the fact that the siloxane and polyoxyalkylene reactants used to produce the block copolymers are themselves usually mixtures. Suitable block copolymers include hydrolyzable and non-hydrolyzable block copolymers. The ratio of hydrophobic to hydrophilic groups in the block copolymer surfactants of this invention should be such that the resulting compound should not be highly soluble in either of the phases. Such compounds will have hydrophilic-lipophilic balance numbers of 4 to 14. Said hydrophilic-lipophilic balance, hereinafter referred to as HLB, is a measure of the balance of the size and strength of the hydrophilic (water-loving or polar) and the lipophilic (oil-loving or non-polar) groups of a surface active agent. The HLB of a surface active agent is related to its solubility and a surface active agent having a low HLB will tend to be oil-soluble, while one having a high HLB will tend to be water-soluble. The types of structures which will satisfy the requirements of this invention include compounds of the formula:

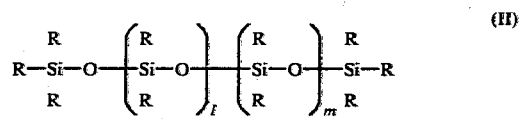

where each R is an alkyl groups with 1-18 carbon atoms and preferably is a methyl group, R contains polyalkoxy groups which can be either polyoxyethylene or poly-(oxyethylene-oxypropylene) mixtures and is preferably linked to the silicon atom by a carbon-silicon bond, and $l$ and $m$ are such that the resulting compounds are liquid, possess the described HLB value, and exhibit only limited solubility in either of the phases (antifoam and aqueous solution). The art of making these compounds already exists. It is described e.g. in U.S. Pat. Nos. 2,834,748, 2,917,840, 3,398,104, 3,402,192, 3,507,815 and 3,741,917. Typical examples of such surfactants are:

|  | HLB |  |
|---|---|---|
| $Me_3SiO(Me_2SiO)_{20}(MeSiO)_{3.2}SiMe_3$<br>$\quad\quad\quad\quad\quad\quad\quad\quad\quad\quad\mid$<br>$\quad\quad\quad\quad\quad\quad\quad\quad\quad C_3H_6(OC_2H_4)_7OCH_3$ | 7.6 | (III) |
| $Me_3SiO(Me_2SiO)_{20}(MeSiO)_{3.2}SiMe_3$<br>$\quad\quad\quad\quad\quad\quad\quad\quad\quad\quad\mid$<br>$\quad\quad\quad\quad\quad C_3H_6(OC_2H_4)_{19}(OC_3H_6)_{14}OC_4H_9$ | 13.0 | (IV) |
| $Me_3SiO(Me_2SiO)_{37}(MeSiO)_3SiMe_3$<br>$\quad\quad\quad\quad\quad\quad\quad\quad\quad\quad\mid$<br>$\quad\quad\quad\quad\quad\quad\quad\quad\quad C_3H_6(OC_2H_4)_7OCH_3$ | 7.3 | (V) |

These surfactants can be blended with the composition C at anywhere from 1-20 percent by weight, preferably about 10%.

In above Equations (2) and (3), X is a semi-finished product obtained after controlled blending of the intermediate composition C with the surfactant D. It has been found that excessive mixing at this stage is deleterious to product performance. This product itself can be used as an antifoam. However, its utility and performance can be significantly improved by successive processing.

In above Equation (3), F is a surfactant or a surfactant mixture used to emulsify X in water. Typically, it can be polyoxyethylene alcohols, available commercially as Brij, sorbitan fatty acid esters, available commercially as Span, polyoxyethylene acids, available commercially as Myrj, ethoxylated $C_{11}-C_{15}$ alcohols with three to 15 moles of ethylene oxides, available commercially as Tergitol, or mixtures thereof.

In above Equation (3), Y is a final product which is an emulsion containing 50-99% water. The emulsification is carried out in such a manner that the particles emulsified generally have a particle size of from about 7 to about 20 microns and preferably from 9 to 11 microns. Emulsifying techniques are well known to those skilled in the art and it is thus merely necessary to carry out simple experiments to arrive at the desired particle sizes. An advantageous method, for example, is to employ suitable stirring speeds, these being dependent on the nature of the composition to be emulsified. The particles are present in statistical distribution (Gauss distribution) with a variation coefficient of from 10 to 15% or less, the variation coefficient defining the distance of each turning point of the Gauss distribution curve from its peak in percent of the peak value.

The product Y when compared with known silicone antifoams performs significantly better, particularly in foaming systems containing high foaming surfactant concentrates and/or containing ionic foaming surfactants, such as potassium oleate, sodium dodecyl sulfate, or dodecyl amines. Particularly in foaming systems containing ionic surfactants the performance of the state-of-the-art silicone antifoams may be significantly inhibited due to the interaction between antifoam droplets and the ionic foaming surfactant. These interactions, which are dependent on the concentration and the nature of the foaming surfactants, result at least in part from surfactant adsorption and the consequent development of surface charge on the antifoam as well as foam bubble surface. Significant build-up of surface charge tends to inhibit the antifoam transport to the similarly charged foam bubble. That is, the electrical repulsive force causes the antifoam action to become less efficient. In such systems only those antifoams will perform effectively which are capable of either minimizing or overcoming the repulsive forces. The product Y proved to be highly effective also even in several highly viscous system such as 5–10% aqueous solutions of polyvinyl alcohol (88–90% hydrolyzed).

One embodiment of this invention is a process, for reducing foaming in an aqueous liquid having a viscosity of at least 100 centistokes at 25° C. and having a tendency to foam, which comprises forming a mixture of said liquid and an antifoam composition which comprises a polydiorganosiloxane oil having a viscosity in the range of 5,000 to 30,000 centistokes at 25° C., 1–20 parts by weight per 100 parts by weight of the oil of a finely divided hydrophobic solid having a surface area of from 50 to 1,000 square meters per gram, and 1–20 parts by weight per 100 parts by weight of the oil and solid together of a siloxane-oxyalkylene block copolymer surfactant having a hydrophilic-lipophilic balance in the range of 4 to 14.

The following examples illustrate the preparations, the dimethylpolysiloxane oils utilized correspond to Formula I above wherein n is varied to result in oils having different viscosities. (The abbreviation "ctks" refers to centistokes measured at 25° C.) The terminology "hydrophobic silica" refers to a product derived from a fumed silica base which is over 99.8% pure $SiO_2$ and in which the hydrophilic hydroxyl groups which normally populate the silica surface are replaced with trimethylsiloxy groups. The product is commercially available as Tullanox 500 (BET surface area: 245 $m^2/gm$. The polysiloxane-oxyalkylane block copolymer surfactant is the one depicted in Formula III above.

PREPARATIVE EXAMPLE 1

Hydrophobic silica, 4.5 grams, is mixed with dimethylpolysiloxane oil having a viscosity of 10,000 cstks, 145.5 grams, in a laboratory size dough mixer at medium speed for 15 minutes. Then polysiloxaneoxyalkylene block copolymer surfactant, 16.67 grams, is added to the mixture and mixing is continued for 10 minutes. The resulting composition can be used per se as an antifoaming agent.

PREPARATIVE EXAMPLE 2

The product of Preparative Example 1 is emulsified as follows: a mixture of sorbitan monostearate, commercially available as Span 60, polyoxyethylene stearate, commercially available as Myrj 52 S, and water in a 1.7:1.3:3.0 weight ratio is prepared by first dissolving the polyoxyethylene stearate in the appropriate amount of water at 60° C. and stirring in slowly the sorbitan stearate to obtain a homogeneous mixture. The mixture is added to the product of Preparative Example 1 in a dough mixer and the composition is mixed at medium speed for 15 minutes. Then, while mixing continues, water is slowly added. The resulting product is diluted with water to give a 10% by weight active antifoam emulsion, weight-average particle size 9.5 micrometers.

PREPARATIVE EXAMPLE 3

Hydrophobic silica, 2.25 grams, is mixed with dimethylpolysiloxane oil having a viscosity of 10,000 cstks, 72.75 grams, for 10 minutes. The product is then mixed with polysiloxane-oxyalkylene block copolymer surfactant, 8.33 grams, for 10 minutes. The resulting composition was diluted 10-fold using Dimethyl Carbitol (1,5-dimethoxydiethylether) solvent.

PREPARATIVE EXAMPLES SHOWING VARIATIONS IN MIXING TIMES

Hydrophobic silica, A, 4.5 grams, is mixed with dimethyl polysiloxane oil having a viscosity of 10,000 cstks, B, 145.5 grams, in a dough mixer at medium speed for varying periods of time. Then polysiloxane-oxyalkylene block copolymer surfactant, D, 16.67 grams, is added to the mixture and mixing is continued for varying periods of time.

| Preparative Example No. | Time Mixing A + B (min.) | Time Mixing AB + D (min.) |
|---|---|---|
| 4 | 5 | 10 |
| 5 | 10 | 1 |
| 6 | 10 | 3 |
| 7 | 10 | 5 |
| 8 | 10 | 10 |
| 9 | 10 | 15 |
| 10 | 20 | 10 |
| 11 | 360 | 10 |

PREPARATIVE EXAMPLE 12

The product of Preparative Example 8 is emulsified by the procedure described in Preparative Example 2.

PREPARATIVE EXAMPLE 13

Hydrophobic silica, 4.5 grams, is mixed with dimethylpolysiloxane oil having a viscosity of 10,000 cstks, 145.5 grams, in a dough mixer at medium speed for 10 minutes. Then polysiloxane-oxyalkylene block copolymer surfactant, 8.33 grams, is added to the mixture and mixing is continued for 10 minutes. The resulting composition is emulsified by the procedure described in Preparative Example 2, providing a product with a weight-average particle size of 10.0 micrometers.

PREPARATIVE EXAMPLE 14

Hydrophobic silica, 4.5 grams, is mixed with dimethylpolysiloxane oil having a viscosity of 5,000 cstks, 145.5 grams, in a dough mixer at medium speed for 10 minutes. Then polysiloxane-oxyalkylene block copolymer surfactant, 16.7 grams, is added to the mixture and mixing is continued for 10 minutes. The resulting composition is emulsified by the procedure described in Preparative Example 2.

PREPARATIVE EXAMPLE 15

Hydrophobic silica, 4.5 grams, is mixed with dimethylpolysiloxane oil having a viscosity of 30,000 cstks, 145.5 grams, in a dough mixer at medium speed for 10 minutes. Then polysiloxane-oxyalkylene block copolymer surfactant, 16.67 grams, is added to the mixture and mixing is continued for 10 minutes. The resulting composition is emulsified by the procedure described in Preparative Example 2, providing a product with a weight-average particle size of 10.3 micrometers.

BLEND TECHNOLOGY

In the following preparative examples, various novel high viscosity antifoams of our invention are blended with a low viscosity antifoams in order to make a more versatile antifoam composition. The blends of Preparative Examples 17 and 19 fall within the scope of the present invention. The low viscosity antifoam is prepared by mixing dimethylpolysiloxane oil of 500 cstks viscosity with 3% by weight of fumed fine silica, heating to 150° C. for two hours, and cooling to room temperature.

PREPARATIVE EXAMPLE 16

Hydrophobic silica, 6.0 grams, is mixed with dimethylpolysiloxane oil having a viscosity of 10,000 cstks, 194 grams, in a dough mixer at medium speed for 5 minutes. Then the low viscosity antifoam mentioned above, 100 grams, is added to the mixture and mixing is continued for 10 minutes, resulting in a dimethylpolysiloxane oil viscosity of 4470 cstks. Then polysiloxane-oxyalkylene block copolymer surfactant, 33.4 grams, is added to the mixture and mixing is continued for 10 minutes. The resulting composition is emulsified by the procedure described in Preparative Example 2, providing a product with a weight-average particle size of 8.6 micrometers.

PREPARATIVE EXAMPLE 17

Hydrophobic silica, 7.2 grams, is mixed with dimethylpolysiloxane oil having a viscosity of 10,000 cstks, 232.8 grams, in a dough mixer at medium speed for 5 minutes. Then the low viscosity antifoam mentioned above, 60 grams, is added to the mixture and mixing is continuing for 10 minutes, resulting in a dimethylpolysiloxane oil viscosity of 6300 cstks. Then polysiloxaneoxyalkylene block copolymer surfactant, 33.4 grams, is added to the mixture and mixing is continued for 10 minutes. The resulting composition is emulsified by the procedure described in Preparative Example 2, providing a product with a weight-average particle size of 10.5 micrometers.

PREPARATIVE EXAMPLE 18

The emulsion prepared by applying the procedure described in preparative example 2 to the low viscosity antifoam mentioned above is mixed with the emulsion product of Preparative Example 12 in the proportion of 4:1, resulting in a polydimethylsiloxane oil viscosity of 1608 centistokes.

PREPARATIVE EXAMPLE 19

The emulsion prepared by applying the procedure described in Preparative Example 2 to the low viscosity antifoam mentioned above is mixed with the emulsion product of Preparative Example 12 in the proportion of 1:4, resulting in a polydimethylsiloxane oil viscosity of 6300 centistokes.

The following examples establish the criticality of, and unexpectedly improved results due to, the various parameters recited in the appended claims.

ANTIFOAM TEST PROCEDURE

The antifoam tests were conducted by mixing 250 ml of foaming solution with appropriate concentrations of antifoam. The term "concentration of antifoam" refers, in all the tests described here, to the weight concentration of silicone oil/silica mixture in the total foaming solution. The aforementioned mixture a course glass frit (20–60 millimicron average pore size) under a constant gas flow rate in a 1000 milliliter graduated glass cylinder. The rise of foam as a function of foaming time is recorded.

The mixing of the antifoam with the foaming solution was accomplished by the use of a wrist action mixer. The control of antifoam/foaming solution mixing intensity and time has been found to be of critical importance. Therefore these parameters were kept constant. Furthermore, to obtain a high degree of reproducibility, it is important to clean the glass frit and glassware thoroughly such that they are well wetted by the foaming solutions. For this purpose it is important to clean the frit and glassware, before each experiment, with basic sodium hydroxide solution and then chromic acid followed by thorough washing with distilled water. The glass frit is always kept soaking in distilled water until used. Under the above stated conditions, from a foaming system consisting of 0.5% sodium dodecyl sulfate in water and in the absence of any antifoam, one can obtain a foam volume of 1000 milliliters in 100 seconds. Linear increase in the foam volume with foaming time, even in the presence of antifoam, is typical of a well dispersed antifoam. The rate of foam rise at constant air flow rate can be represented as:

$$dF/dt = K$$

where F is the foam volume at time t, and K is the rate constant, a function of aeration rate, type, and amount of antifoam present.

Under the conditions of constant aeration, one can define antifoam efficiency, N, as:

$$N = K_o/K$$

where $K_o$ and K are the foaming rates without and with antifoam present, at a constant aeration rate. Thus, N=1 means either the absence of an antifoam or total ineffectiveness of the antifoam while N=20, for example, means a 20-fold increase in the time that would be required to generate the same foam volume in the presence of antifoam, or that the presence of antifoam will reduce the foaming rate by a factor of 20. In other words, the higher the value of N obtained for a given antifoam the better will it be considered. The efficiency factor N has been found to be extremely useful in characterizing the performance of an antifoam in a particular system.

The foaming systems utilized in the tests which follow can be categorized as normal, ionic, and viscous. All employ commercially available foaming agents. They are aqueous solutions of:

| | |
|---|---|
| Normal | Tergitol 15-S-9 (ethoxylated $C_{11}$-$C_{15}$ alcohols - 9 moles ethylene oxide), available from Union Carbide Corporation |
| | National Aer-O-Foam 3% Regular (fire fighting foam - protein based), available from National Foam System, Inc. |
| Ionic | Sodium Dodecyl Sulfate, available 98 + % pure from E.M. Laboratories, Inc. |
| | Potassium Oleate, available as Green Soap, 70% active in ethanol, from Eli Lilly and Co. |
| | Palmolive Dishwashing Liquid, available from Colgate-Palmolive Co. |
| Viscous | Gelvatol 20/60 (partially hydrolized polyvinyl acetate - 7.5% polyvinyl alcohol), available from Monsanto |
| | Elvanol 50/42 (partially hydrolized polyvinyl acetate - 5.0% polyvinyl alcohol), available from DuPont. |

Our experiments with mixing times gave the following results in 0.5% sodium dodecyl sulfate systems:

| Product of Prep. Ex. No. | Antifoam Efficiency, N, at 200 Ppm Conc. Antifoam |
|---|---|
| 4 | 18 |
| 5 | 8.5 |
| 6 | 9.6 |
| 7 | 15.8 |
| 8 | 16.5 |
| 9 | 11.0 |
| 10 | 19 |
| 11 | 17 |

The results suggest that (1) in the first step, mixing time is not very critical as long as sufficient time of mixing is given, and (2) in the second step, excessive mixing is deleterious to product performance and, under these conditions, 10 minutes mixing is optimum.

COMPARISON WITH LOW VISCOSITY ANTIFOAMS

In order to demonstrate the criticality to our invention of the silicone oil viscosity range, the following compositions were prepared:

An antifoam composition (Af-17N) was prepared by mixing 72.75 grams of dimethylpolysiloxane oil (500 cstks) with 2.25 grams of 3% by weight fumed fine silica for 10 minutes followed by heating at 150 for two hours and slowly cooling to room temperature. The product was then mixed with 8.33 grams of polysiloxane-oxyalkylene block copolymer surfactant for 10 minutes. The mixture was diluted 10-fold using Dimethyl Carbitol solvent.

An antifoam composition (Af-18N) was prepared by mixing 72.75 grams of dimethylpolysiloxane oil (500 cstks) with 2.25 grams of hydrophobic silica for 10 minutes. The product was then mixed with 8.33 grams of polysiloxane-oxyalkylene block copolymer surfactant for 10 minutes. The mixture was diluted 10-fold using Dimethyl Carbitol solvent.

Two antifoam compositions, Af-20N(a) and Af-20N(b), were prepared as follows: 3% by weight fumed fine silica in dimethylpolysiloxane oil (500 cstks) were mixed, heated at 150° C. for two hours, and slowly cooled to room temperature. 12.0 grams of this product was mixed with 108.0 grams of Dimethyl Carbitol. The solvent Dimethyl Carbitol (DMC) effectively dissolves dimethylpolysiloxane oil and leaves silica in suspension. The silica was separated from this dispersion by centrifugation for 100 minutes (to give complete separation). The residue, which is a hydrophobic silica, was redispersed in two separate fluids (a) 1:9 dimethylpolysiloxane oil (500 cstks)/Dimethyl Carbitol mixture and (b) 1:9 dimethylpolysiloxane oil (10,000 cstks)/Dimethyl Carbitol mixture, to yield 3% (wt/wt) silica based on the dimethylpolysiloxane oil. The suspensions were further mixed with polysiloxaneoxyalkylene block copolymer surfactant to obtain 10% wt/wt surfactant with respect to the dimethylpolysiloxane oil.

| Antifoam Systems (200 ppm in DMC) | | Efficiency, N, in 0.5% Sodium Dodecyl Sulfate |
|---|---|---|
| Af-17N | Low viscosity (5% Surfactant) | 1.6 |
| Af-18N | Low viscosity | 9.6 |
| Prep. Ex. 3 | High viscosity | 45.0 |
| Af-20N(a) | Low viscosity | 1.6 |
| Af-20N(b) | High viscosity | 21.0 |

The above results clearly indicate that the use of high viscosity silicone oil yields a superior product. They also indicate (compare Af-20N(b) with Prep. Ex.3) that the nature of the hydrophobic silica can have some effect on antifoam performance.

To study further the effect of silicone oil viscosity on antifoam performance, the products of Preparative Example 8 (10,000 cstks, unemulsified) and 12 (10,000 cstks, emulsified) were compared to the product of the preparation described in Preparative Example 15 before the emulsification step, 15 N (30,000 cstks, unemulsified), the product of Preparative Example 15 (30,000 cstks, emulsified), as well as to products prepared similarly utilizing polydimethylsiloxane oils of 100, 500, and 1000 centistokes. The unemulsified products were diluted 10-fold with Dimethyl Carbitol. The results were as follows:

| | Antifoam Efficiency (N) in 0.5% Sodium Dodecyl Sulfate | |
|---|---|---|
| Oil Viscosity (cstks) | Through DMC (400 ppm) | Emulsion (200 ppm) |
| 100 | 2.7 | |
| 500 | 7.0 | 2.0 |
| 1000 | 10.0 | 10.5 |
| 5400 | 21.33 | |
| 10,000 | 200.0 | 43.0 |
| 30,000 | 200.0 | 45.0 |

EFFECT OF SILOXANE-OXYALKYLENE BLOCK COPOLYMER SURFACTANT CONCENTRATION ON ANTIFOAM PERFORMANCE

In order to demonstrate the effect of the polysiloxane-oxyalkylene block copolymer surfactant on antifoaming efficiency, the performances of the following products were compared: (a) the product of Preparative Example 12, which contains 10% surfactant, (b) the product of Preparative Example 13, which contains 5% surfactant, and (c) a product prepared by mixing 145.5 grams of dimethylpolysiloxane oil having a viscosity of 10,000 cstks with 4.5 grams of hydrophobic silica in a dough mixer at medium speed for 10 minutes, followed by mixing for an additional 10 minutes, and then emulsifying by the procedure described in Preparative Example 2. Product (c) contains 0% surfactant. All three of these antifoam emulsions were tested at 200 parts per million.

| Foaming System | ANTIFOAM EFFICIENCY (N) | | |
|---|---|---|---|
| | 0% Surfactant | 5% Surfactant | 10% Surfactant |
| 0.5% Sodium Dodecyl Sulfate | 1.9 | 13.0 | 36.4 |
| 0.5% Potassium Oleate Soap | 4.4 | 8.9 | 9.0 |
| 0.5% Tergitol 15-S-9 | 2.5 | 3.2 | 4.0 |
| 10% Fire Fighting Foam | 16.8 | 38.4 | 53.0 |
| 0.5% Dishwashing Liquid | 4.8 | 13.9 | 18.0 |

COMPARATIVE EXAMPLE 5

The products of Preparative Example 1 and of Preparative Example 2 were compared to a product prepared by first mixing dimethylpolysiloxane oil of 500 cstks viscosity with 3% fumed fine silica, then heating to 150° C. for two hours and cooling to room temperature, and then emulsifying by the procedure described in Preparative Example 2.

| Foaming System | ANTIFOAM EFFICIENCY AT 400 PPM ANTIFOAM CONC. | | |
|---|---|---|---|
| | Reference Product | Prep. Ex. 2 | Prep. Ex. 1 |
| 0.5% Sodium Dodecyl Sulfate | 1.88 | 200 | 192 |
| 0.5% Potassium Oleate Soap | 2.51 | 74 | |
| 0.5% Dishwashing Liquid | 5.85 | 13.7 | |

| Foaming System | ANTIFOAM EFFICIENCY AT 600 PPM ANTIFOAM CONC. | |
|---|---|---|
| | Reference Product | Prep. Ex. 2 |
| 7.5% Gelvatol | 140 | 200 |
| 5.0% Elvanol | 62 | 116 |

COMPARATIVE EXAMPLE 7

The product of Preparative Example 2 was compared to a product prepared by mixing dimethylpolysiloxane oil of 500 cstks viscosity with 3% fumed fine silica, then heating to 150° C. for two hours and cooling to room temperature, and then emulsifying by the procedure described in Preparative Example 2.

| Foaming System | ANTIFOAM EFFICIENCY (N) AT DIFFERENT ANTIFOAM CONC. | | | | | |
|---|---|---|---|---|---|---|
| | Reference Product | | | Prep. Ex. 1 | | |
| | 200 ppm | 400 ppm | 1200 ppm | 200 ppm | 400 ppm | 1200 ppm |
| 0.5% Sodium Dodecyl Sulfate | | 1.9 | 9.5 | 45 | >200 | |
| 0.5% Potassium Oleate Soap | | 2.5 | 13 | 13 | 75 | |
| 0.5% Dishwashing Liquid | | 6.5 | >200 | 30 | >200 | |

ANTIFOAM PERFORMANCE IN DIFFERENT FOAMING SYSTEMS

The products of Preparative Examples 12, 16, and 17 were compared to an antifoam prepared by mixing dimethylpolysiloxane oil of 500 cstks viscosity with 3% fumed fine silica, heating to 150° C. for two hours, cooling to room temperature, and emulsifying by the procedure described in Preparative Example 2.

| Foaming Systems | ANTIFOAM EFFICIENCY (N) (200 ppm) | | | |
|---|---|---|---|---|
| | Reference | Prep. Ex. 16 | Prep. Ex. 17 | Prep. Ex. 12 |
| 0.5% Sodium Dodecyl Sulfate | 1.8 | 4.6 | 9.9 | 36.4 |
| 0.5% Potassium Oleate Soap | 2.1 | 6.2 | 10 | 9 |
| 0.5% Dishwashing Liquid | 4.0 | 11 | 18 | 18 |
| 10% Fire Fighting Foam | 200 | 120 | >200 | 53 |
| 0.5% Tergitol 15-S-9 | — | 17 | 12 | 4.0 |

The reference antifoam was also compared to the product of Preparative Example 12 in viscous systems.

| Foaming Systems | ANTIFOAM EFFICIENCY (N) (400 ppm) | |
|---|---|---|
| | Reference | Prep. Ex. 12 |
| 7.5% Gelvatol (300 cstks) | 140 | 200 |
| 5.0% Elvanol (48 cstks) | 62 | 116 |

The reference antifoam was also compared to the products of Preparative Examples 12, 18, and 19, with the following results:

| Foaming Systems | ANTIFOAM EFFICIENCY (N) (400 ppm) | | | |
|---|---|---|---|---|
| | Reference | Prep. Ex. 18 | Prep. Ex. 19 | Prep. Ex. 12 |
| 0.5% Sodium Dodecyl Sulfate | 2.5 | 82 | 200 | 200 |
| 10% Firefighting Foam | 200 | 200 | 200 | 200 |

The differences in foaming activity are expecially significant in the difficult to defoam systems involving sodium dodecyl sulfate, potassium oleate soap, and dishwashing liquid.

ALTERNATE PREPARATIONS

While the Preparative Examples given above demonstrate the preferred method for making the antifoam compositions of the invention, they can be made in other ways. The following examples demonstrate other mixing procedures:

A = 87.3 parts by weight dimethylpolysiloxane oil (10,000 cstks)
B = 2.7 parts by weight hydrophobic silica
D = 10.0 parts by weight polysiloxane-oxyalkylene block copolymer surfactant
I. A + B + D are mixed simultaneously for 25 minutes
II. A + D are mixed for 10 minutes, then B is mixed in for 15 minutes
III. D + B are mixed for 10 minutes, then A Products I–III were compared to the product of Preparative Example I. Their antifoam efficiencies N were determined in two different standard foaming systems at the concentrations indicated.

| Foaming Systems | Product (Antifoam Conc. in Ppm) N | |
|---|---|---|
| 0.5% Sodium | I(375)48.0 | II(380)40.0 |
| Dodecyl Sulfate | III(371)23.7 | Prep. Ex. I(360)80.0 |
| 10% Fire Fight- | I(272)10.6 | II(250)8 |
| ing Foam | III(280)10 | Prep. Ex. I(253)16.5 |

The results indicate that, while alternate methods of preparation do lead to a composition with significant antifoaming characteristics, more efficient antifoaming action is achieved with compositions prepared by the preferred method.

Various modifications and variations of this invention will be apparent to workers skilled in the art. It is to be understood that such modifications and variations are to be included within the purview of this application and the spirit of the appended claims.

What is claimed is:

1. An antifoam composition which comprises a polydimethylsiloxane oil, 1–20 parts by weight per 100 parts by weight of the oil of a finely divided hydrophobic silica having a surface area of at least 50 square meters per gram, and 1–20 parts by weight per 100 parts by weight of the oil and solid together of a siloxane-oxyalkylene block copolymer surfactant having a hydrophilic-lipophilic balance in the range of 4 to 14 wherein the improvement comprises the polydimethylsiloxane oil having a viscosity in the range of 5,000 to 30,000 centistokes at 25° C.

2. An antifoam composition as defined in claim 1 in which the polydimethylsiloxane oil has a viscosity of approximately 10,000 centistokes at 25° C., the hydrophobic silica has a surface area of approximately 245 square meters per gram, and the siloxane-oxyethylene block copolymer surfactant has a hydrophilic-lipophilic balance of approximately 7.6.

3. An antifoam composition as defined in claim 1 in which the polydimethylsiloxane oil is present in about 87.3 parts by weight, the hydrophobic silica is present in about 2.7 parts by weight, and the siloxane-oxyethylene block copolymer surfactant is present in about 10.0 parts by weight, all per 100.0 parts by weight of the composition.

4. An antifoam composition as defined in claim 1 which contains water and an emulsifying agent.

5. An antifoam composition as defined in claim 4 in which the emulsifying agent is selected from the group consisting of polyoxyethylene alcohols, sorbitan fatty acid esters, polyoxyethylene acids, and mixtures thereof.

6. An antifoam emulsion which comprises 50–99% water into which an antifoam composition as defined in claim 1 has been dispersed by means of an emulsifying agent.

7. An antifoam emulsion as defined in claim 6 wherein the emulsifying agent comprises a mixture of sorbitan monostearate and polyoxyethylene stearate.

8. An antifoam composition in which 1–20 weight % of a siloxane-oxyalkylene block copolymer having a hydrophilic-lipophilic balance in the range of 4–14 has been blended with a homogeneous mixture of 1–20 weight % of a finely divided hydrophobic silica having a surface area of from 50 to 1,000 square meters per gram and 99–80 weight % of a polydimethylsiloxane oil having a viscosity in the range of 5,000 to 30,000 centistokes at 25° C.

9. An antifoam emulsion in which the antifoam composition as defined in claim 8 has been dispersed in a major amount of water by means of an emulsifying agent.

10. A process for reducing foaming in aqueous liquids having a tendency to foam which comprises forming a mixture of said liquid and a composition as defined in claim 1.

11. A process as claimed in claim 10 wherein said aqueous liquid contains an ionic surfactant which increases the tendency of the liquid to foam and which is present in an amount close to or above its critical micelle concentration.

12. A process as defined in claim 10 wherein said aqueous liquid has a viscosity of at least 100 centistokes at 25° C.

* * * * *